Oct. 22, 1929.

W. J. PEETS

CENTERLESS GRINDER

Re. 17,470

Original Filed June 14, 1921 4 Sheets-Sheet 1

WITNESSES:
Godfrey Tecina
M. M. Davis

INVENTOR
Wilbur J. Peets,
BY Henry J. Miller
ATTORNEY

Oct. 22, 1929.
W. J. PEETS
CENTERLESS GRINDER
Re. 17,470
Original Filed June 14, 1921
4 Sheets-Sheet 2
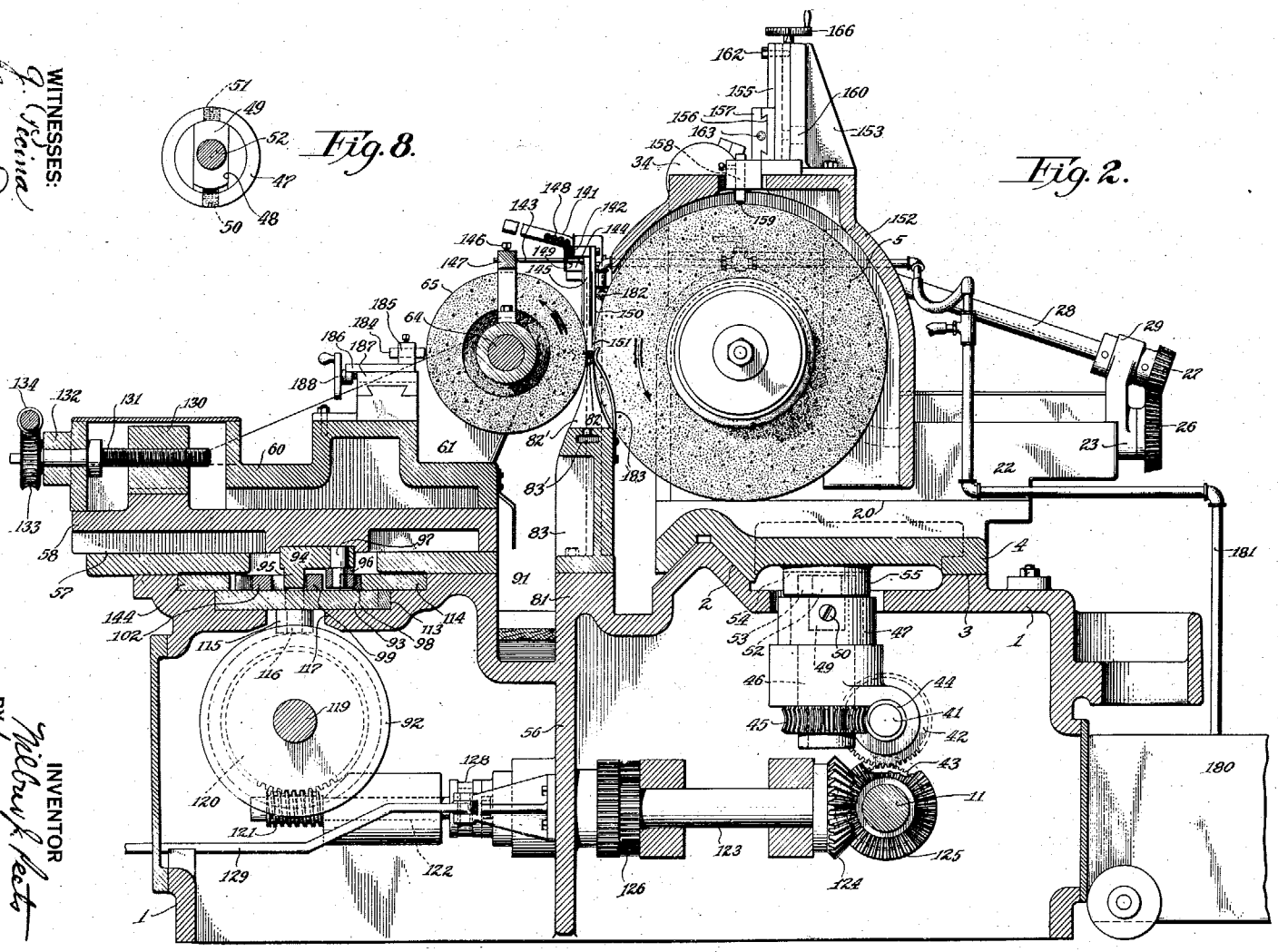
WITNESSES:
J. Pecina
M. W. Davis
INVENTOR
Wilbur J. Peets
BY
Henry J. Miller
ATTORNEY Oct. 22, 1929. W. J. PEETS Re. 17,470

CENTERLESS GRINDER

Original Filed June 14, 1921 4 Sheets-Sheet 3

WITNESSES:
Godfrey Pecina
M. M. Dove

INVENTOR
Wilbur J. Peets
BY Henry J. Miller
ATTORNEY

Oct. 22, 1929. W. J. PEETS Re. 17,470

CENTERLESS GRINDER

Original Filed June 14, 1921 4 Sheets-Sheet 4

WITNESSES:
Godfrey Kleinig
M. N. Davis

INVENTOR
Wilbur J. Peets
BY Henry J. Miller
ATTORNEY

Reissued Oct. 22, 1929 Re. 17,470

UNITED STATES PATENT OFFICE

WILBUR J. PEETS, OF ELIZABETH, NEW JERSEY, ASSIGNOR, BY MESNE ASSIGNMENTS, TO CINCINNATI GRINDERS INCORPORATED, OF CINCINNATI, OHIO, A CORPORATION OF OHIO

CENTERLESS GRINDER

Original No. 1,599,584, dated September 14, 1926, Serial No. 477,355, filed June 14, 1921. Application for reissue filed May 18, 1927. Serial No. 192,456.

This invention relates to an automatic centerless grinder and has for an object to provide a grinder of the centerless type in which the articles to be ground are automatically fed to the grinding point from a source of supply and also automatically discharged from the grinding point after the grinding operation has been completed. It is also an object of the invention to provide a machine of this type which will simultaneously grind two or more spaced bearings on a single article such as a crank-shaft.

With these and other objects in view, the machine, in its preferred form, is provided with one or more sets of peripherally opposed grinding and work-rotating and governing or controlling wheels. The grinding wheel or wheels is or are mounted on a slide which in operation may be continuously reciprocated in a direction longitudinally of the axes of the wheels which are rotated at a relatively high speed.

The work rotating or governing wheel or wheels is or are mounted on a separate slide which is automatically fed toward and from the periphery of the grinding wheel to allow for the insertion and removal of the work and also operates a work-feeding means in proper timing relation therewith.

Figures 1, 9:
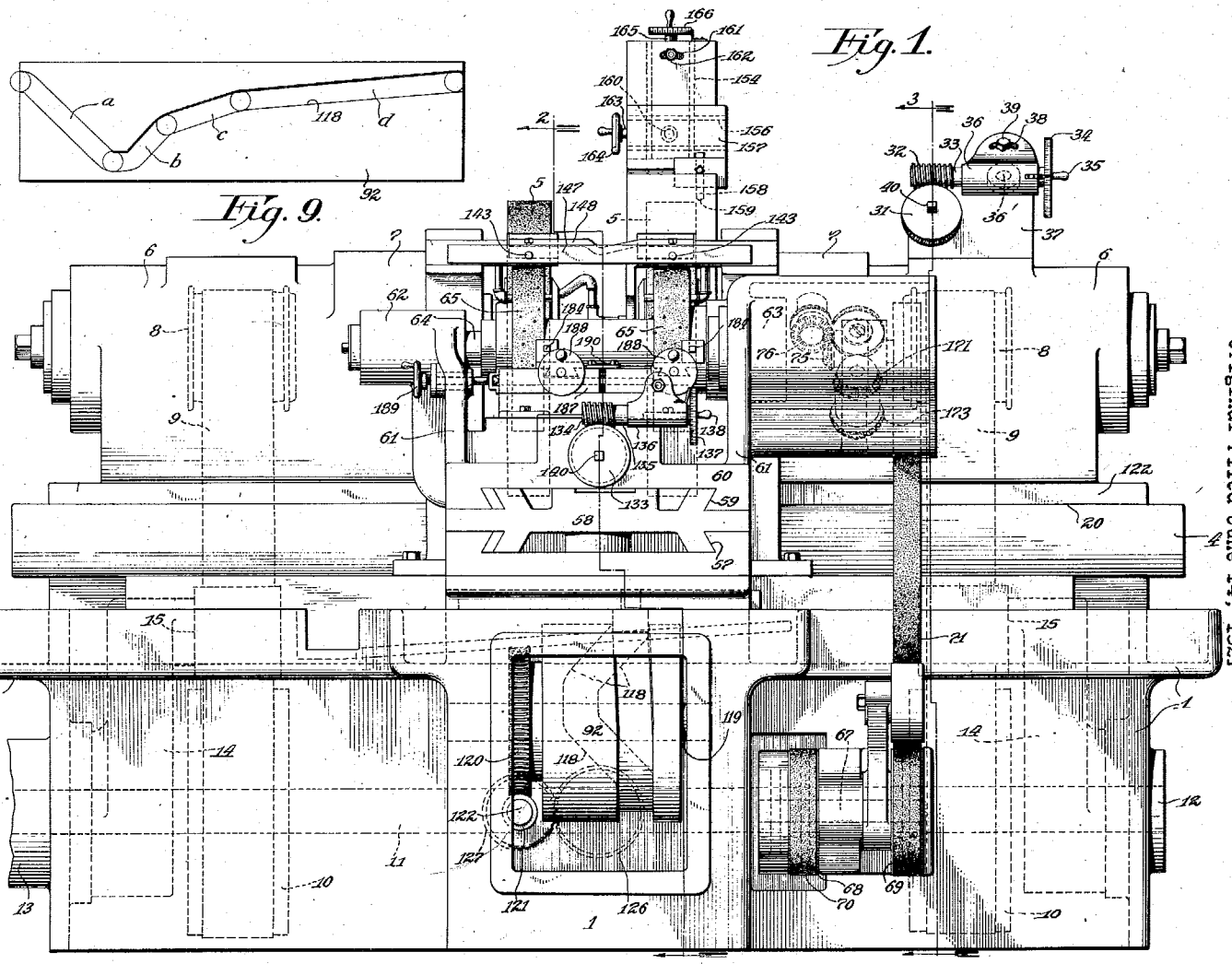
Figures 3, 10:
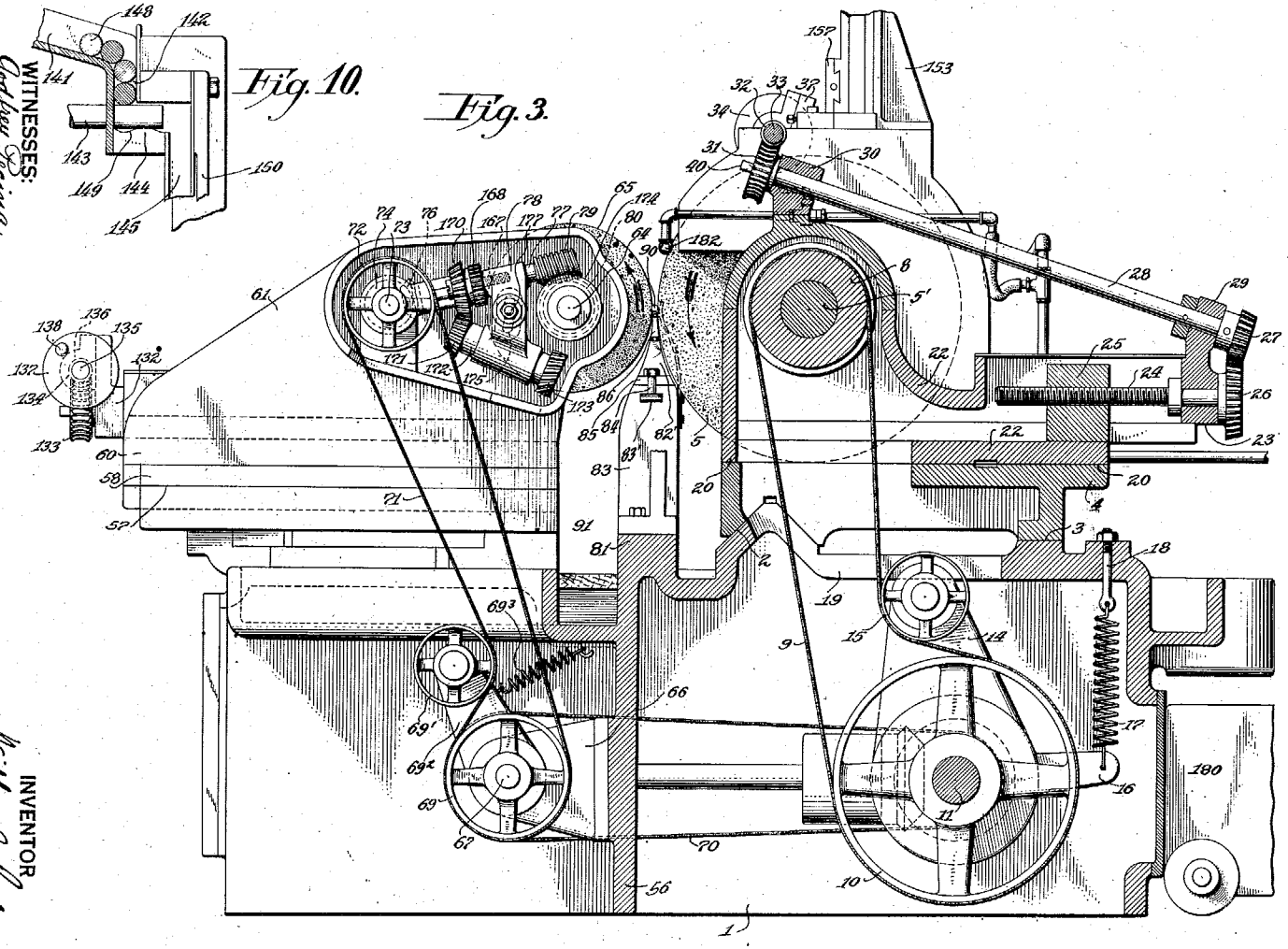
Figure 4:
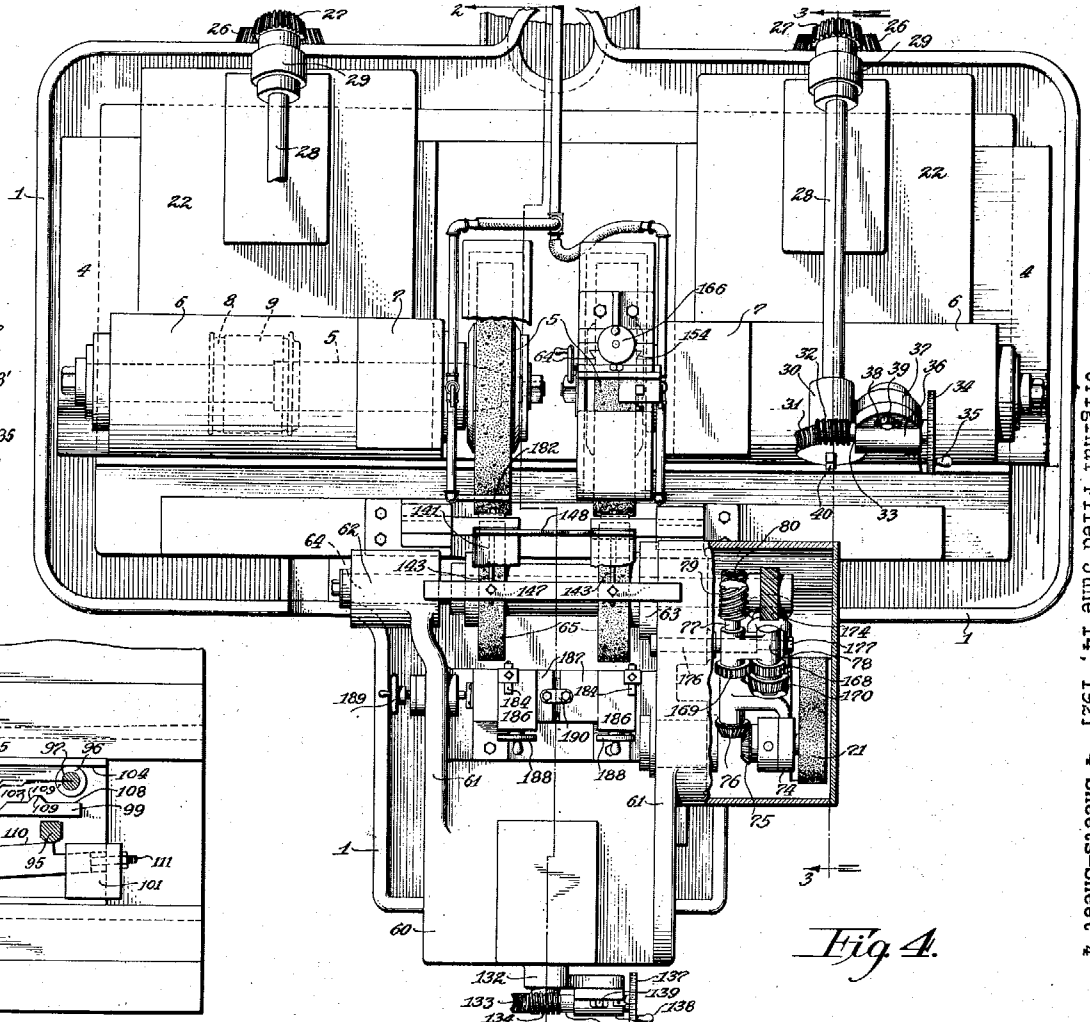
Figure 5:
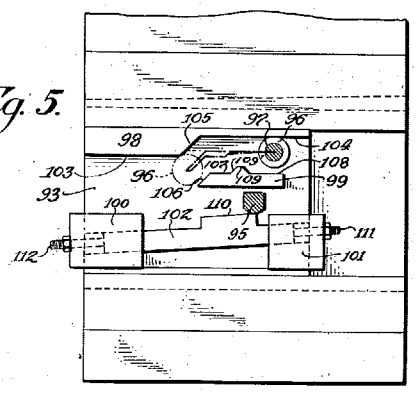
Figure 7:
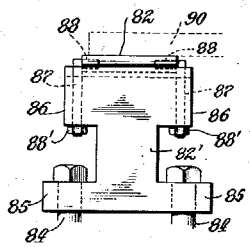
Figure 6:
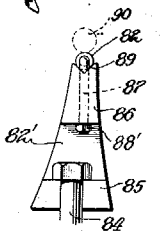

Referring to the accompanying drawings, Fig. 1 is a front elevation of my grinder. Fig. 2 is a transverse section substantially on the line 2—2 of Figs. 1 and 4. Fig. 3 is a transverse section substantially on the line 3—3 of Figs. 1 and 4. Fig. 4 is a top plan view upon a reduced scale. Fig. 5 is a detail plan view of the cam-plate for shifting the governing wheel. Fig. 6 is a detail end view of a work-support. Fig. 7 is a side elevation thereof. Fig. 8 is a detail of the means for reciprocating the grinding wheel. Fig. 9 is a view showing the development of the cam-groove in the cam-cylinder 92, and Fig. 10 is a detail view of a portion of the work feeding mechanism on an enlarged scale.

In its preferred form my invention comprises a frame 1 provided on its top surface with a slideway comprising an inverted V 2 and a plain bearing rib 3 upon which is mounted a slide 4 which carries one or more grinding wheels 5. In the present instance two grinding wheels are shown. These grinding wheels are what are termed peripheral grinders in that the grinding surface is on the periphery of these wheels. Each wheel is supported by a shaft 5′ which is mounted to rotate in spaced bearings 6 and 7 mounted upon the slide 4. The grinder-shaft between the bearings is provided with a pulley 8 which is driven by means of a belt 9 passing to a driving pulley 10 mounted upon the main power-shaft 11 which rotates in bearings 12 and 13 in the frame 1. The shaft 11 is located below the slide upon which the grinding wheels are mounted so that it and the driving pulleys are located within the frame and are completely enclosed thereby.

Fulcrumed upon the shaft 11 is a frame 14 having a free arm at the end of which is rotatably mounted an idler-pulley 15 adapted to bear against the belt 9 and this frame 14 also has an arm 16 to which is attached one end of a spring 17, the other end of this spring being secured to an eye bolt or equivalent device 18 mounted in the frame 1. The spring 17 tends to turn the frame 14 on the shaft 11 and through the idler pulley 15 maintains the belt 9 tight at all times. It will be noted from Fig. 3 that the belt 9 passes upwardly from the pulley 10 through a convenient opening 19 formed in the upper wall of the frame 1.

The slideway 2—3 extends longitudinally of the frame 1 and substantially parallel with the axes of the grinding wheels, the slide 4 being formed with inverted V and plain surfaces to slide upon the surfaces 2 and 3. The slide 4 is also formed on its upper surfaces with slideway 20 extending transversely of the slideway 2—3, and mounted to slide in each of the slideways is a second slide 22 which carries the bearings 6 and 7 for the grinding wheel shaft 5′, there being a slide for each wheel. The outer end of this slide is provided with a bearing 23 in which is mounted a rotatable screw 24 having screw-threaded engagement with a lug 25 on the slide 4 and is provided at its outer end with a gear 26. A second gear 27 meshes with the gear 26 and is mounted upon the inclined shaft 28, this shaft being rotatably mounted at one end in the bearing 29 immediately above the bearing 23 and at the other end in a bearing 30 above the grinding wheel shaft. The shaft 28 has mounted thereon adjacent the bearing 30 a worm-gear 31 which meshes with a worm 32 mounted upon a short shaft 33 provided with a graduated disk 34 having a handle 35 for convenient manipulation. It will be evident that by rotation of the disk 34 the shaft 28 and screw 24 will be rotated and the slides 22 may be adjusted back and forth on the slide 4 as desired. The shaft 33 carrying the worm 32 and the disk 34 is mounted in an adjustable bearing 36, this bearing being fulcrumed on a portion 37 of the frame integral with the bearing 30 and is provided with a curved slot 38 through which a bolt 39 screwed into the support 37 extends. By loosening the bolt 39 the bearing 36 may be turned about its fulcrum 36′ to move the worm 32 out of mesh with the worm-wheel 31 and a crank may then be applied to the square end 40 of the shaft 28 allowing rapid rotation of the screw 24 to give a rapid rough adjustment to the slide 22 supporting the grinding wheel.

The grinding wheels are mounted upon the slide 4 so that they may be reciprocated continuously longitudinally of their axes during the normal grinding operation. The amount of this reciprocation is small, in the present instance, about three-sixteenths of an inch being sufficient. The amount of reciprocation, however, depends upon the type of work to be performed. In some classes of work no reciprocation is given to the grinding wheels. The reciprocatory movement is imparted to the slide 4 by means of a crank which is rotated from the main power-shaft 11. As shown more clearly in Fig. 2 a short shaft 41 is mounted in the frame 1 above the main power-shaft 11 and these two shafts are provided with intermeshing spur-gears 42 and 43 respectively. The shaft 41 is also provided with a worm 44 meshing with a worm-wheel 45 on a vertical shaft 46, which latter shaft at its upper end carries a collar 47 having a transverse groove 48 in which is adjustably mounted a block 49 (Fig. 8). The collar 47 is provided with adjusting screws 50 and 51 extending through the walls thereof from opposite ends of the groove 48 and bear upon the ends of the block 49. By adjusting these screws the block 49 which carries a pin 52 may be adjusted to locate said pin eccentrically of the shaft 46 and the amount of this eccentricity will determine the amount of throw of the pin 52 as the shaft rotates. In the present construction the block 49 may be adjusted to give a reciprocation varying from zero to one quarter of an inch. The pin 52 extends into an opening in the block 53 mounted within a channel 54 formed in a downwardly extending boss 55 on the under side of the slide 4. The channel 54 extends in a direction transversely of the slideway 2—3. It will therefore be seen that as the shaft 46 rotates and with it the eccentrically located pin 52, the slide 4 will be reciprocated longitudinally of the slideway 2—3 and in a direction longitudinally of the axes of the grinding wheels 5, but that no transverse movement will be imparted to this slide because the block 53 has free sliding movement in the transverse channel 54. The gearing 44, 45 is a reducing gearing so that the shaft 46 is rotated at a comparatively low speed, the reciprocatory movement of the slide 4 being also at a relatively low speed.

The frame 1 is provided with a vertically extending wall 56 and on the opposite side of this wall from the slideway 2—3 the frame is provided with a second slideway 57 in which is mounted for sliding movement a slide 58. This slide is provided on its upper side with inclined walls 59 adapted to form a sliding connection with a V groove in the underside of another slide 60. It will be noted that the slideways 57 and 59 extend in a direction transverse to the slideway 2—3. The slide 60 is provided with upwardly extending bearing supports 61 which carry bearings 62, 63 for a shaft 64 mounted to rotate therein, the axis of the shaft extending substantially parallel to the axes of grinding wheels 5. The shaft 64 carries opposite each grinding wheel a governing wheel 65 which is rotated at a relatively low speed by means of mechanism which will now be described.

Secured to the wall 56 are bearing brackets 66 supporting a short shaft 67 carrying pulleys 68 and 69. The pulley 68 carries a belt 70 which belt also passes over a pulley on the main-shaft 11. A second belt 71 connects the pulley 69 with a pulley 72 on a short shaft 73 mounted in bearings 74 carried by the slide 60. An idler pulley 69′ mounted on a frame $69^2$ fulcrumed on shaft 67, is pressed against belt 71 by a spring $69^3$, secured at opposite ends to the frames $69^2$ and 1, and keeps the belt tight in a well known manner. On the opposite side of the bearing 74 the shaft 73 is provided with a bevel gear 75 meshing with a second bevel gear 76 on the shaft 77 extending at right angles to the axis of the shaft 73, this shaft being mounted in a frame 78 adjustably secured on the slide 60. This latter shaft 77 is provided with a worm 79 meshing with a worm-wheel 80 upon the shaft 64 carrying the work-governing wheels 65. This train of driving mechanism from the shaft 11 rotates the governing wheels 65 in a direction counter-clockwise as viewed in Figs. 2 and 3 at a relatively low rate of speed.

Mounted upon an upstanding portion 81 of the frame 1 by means of suitable supporting means is a work-rest or support 82, there being one of these supports between each pair of grinding and governing wheels. The supporting means for this work-support comprises a bracket 82′ being secured upon the block 83 by means of bolts 84, the heads of which extend into T-slots 83′ formed upon the upper end of the block 83, the other end of the bolt passing through an outstanding lug 85 upon the bracket 82′ (Figs. 6 and 7). Above and spaced from the lugs 85 the bracket 82′ is provided with other outstanding portions 86 each provided with a vertical hole through which extends the vertical leg 87 of an L-shaped bolt, the horizontal leg 88 of this bolt being adapted to enter a hole or socket drilled in the end of the work-rest 82, as shown in Figs. 6 and 7, the lower end of the vertical leg 87 of the L-shaped bolt being provided with a nut 88′ by means of which the work-rest 82 may be clamped in the V-shaped groove 89 formed in the top surface of the bracket 82′. In operation the work represented in dotted lines at 90 in Figs. 6 and 7 rests upon the top of this tubular support 82 and is adapted to freely rotate thereon during the grinding operation.

As during the grinding operation the work 90 is not fed across the surface of the grinding wheel it is necessary in bringing the work to grinding position and discharging it therefrom that one of the wheels be moved away from the other. Either wheel may be moved to allow for the insertion and removal of the work, but practically it is easier and more convenient to move the governing wheels 65 with respect to the grinding wheels 5. This movement is imparted to the governing wheels through the slide 60 upon which said wheels are mounted. It is most convenient to drop the work to the work-rest from above and to remove the work from the machine by allowing it to drop off the work-rest at the completion of the grinding operation into a chute below the governing wheels 65. It is therefore necessary that after the grinding operation is completed, the grinding wheels with the work-rest, and the governing wheel or wheels be separated a sufficient distance to allow the work to drop from the rest between it and the surfaces of the governing wheels into the trough 91. It is preferable to obtain this separation by retracting the governing wheel or wheels away from the work-rest. After the finished work has dropped into the trough the wheels 65 must be advanced toward the work-support a sufficient distance to prevent the unfinished work passing between it and the work-rest when this piece of unfinished work is dropped on to the rest. The governing wheels 65 are then advanced to press the work against the grinding wheels and are given a slow feeding movement during the grinding operation. These retracting and advancing movements are imparted to the slide 60 carrying the governing wheels 65 through two cam elements 92 and 93 operating in series.

Secured to and extending downwardly from the bottom wall of the slide 58 is a block 94 provided with a downwardly extending lug 95 and an anti-friction roller 96 mounted on a stud 97 secured to said block 94. The sliding cam element 93 cooperates with the lug 95 and the anti-friction roller 96 to reciprocate the slide 58 in certain timing relation with the grinding operation. The sliding cam element 93 is provided on the upper surface thereof with upwardly extending lugs 98 and 99 which coact with the anti-friction roller 96. The cam element 93 is also provided with lugs 100 and 101 in which is adjustably supported the ends of an adjustable cam element 102 as more clearly shown in Fig. 5. The lug 98 is provided with two straight surfaces 103 and 104 between which is an inclined surface 105 and opposed to these surfaces the lug 99 is provided with an inclined surface 106 substantially parallel to the surface 105 and straight surfaces 107 and 108 parallel to the surface 104 but between the two with a substantially V-shaped projection 109. The cam element 102 is located on the opposite side of the lug 109 and is provided with a straight but inclined cam surface 110 which coacts with the lug 95. The cam element 102 is provided on each end with a threaded stud 111 and 112 having nuts by which the cam element may be adjusted longitudinally to vary the effect of the cam surface 110 upon the lug 95. The cam element or plate 93 is slidably mounted in a guideway 113 in the frame 1 and is guided therein by means of guide-plates 114. The cam-plate 93 is provided on its upper surface with an anti-friction roller 115 mounted on a stud 116 secured in the plate, the stud and the roller projecting downwardly through a convenient slot 117 formed in the frame. The anti-friction roller 115 tracts with a cam-groove 118 in the cylindrical surface of the cam element 92. This groove is shaped to reciprocate the plate 93 in a direction longitudinally of the axis of the grinding and governing wheels. By varying the shape of this slot 118 the movements of the plate 93 of course may be varied as desired to advance and retract the governing wheels 65 in different timing relations. In the present embodiment this groove is shaped substantially as shown in Fig. 9 in which passage of roller 115 through the inclined portion *a* moves plate 93 while the governing wheels 65 are being retracted from the grinding wheels 5 to allow discharge of the work, portion *b* brings the wheels through their first advancing movement to loading position, *c* is the loading position and *d* is for the grinding operation. The cam element 92 is mounted on a shaft 119 provided with a worm-wheel 120 which meshes with a worm 121 mounted on the shaft 122 extending at right angles to the shaft 11 in the lower part of the frame 1. A second shaft 123 parallel with the shaft 122 is provided and it has a bevel gear 124 meshing with a bevel gear 125 on the main-shaft 11. The other end of the shaft 123 is provided with a spur-gear 126 meshing with the second spur-gear 127 on the shaft 122. Between the spur-gear 127 and the worm 121 is provided a clutch 128 of any usual construction with a lever 129 extending beyond the frame 1 so that driving connection between the spur-gear 127 and the worm 121 may be disconnected at any time to stop the automatic advancing and retracting of the regulating wheels 65.

As it is desirable that the regulating wheels 65 be given a rapid retracting movement from the work-rest after the grinding operation is completed to allow the work to drop from the rest into the trough 91, this movement is imparted to the supporting slide 58 by the inclined surface 105 reacting against the anti-friction roller 96 as the cam-plate 93 is moved to the right as shown in Fig. 5, the anti-friction roller 96 being then in the dotted line position shown in this figure. The governing wheels 65 are advanced to the grinding position in two stages both of which are comparatively rapid movements. The first stage is caused by the action of inclined surface 106 on the anti-friction roller 96 as it is moved to the left as shown in Fig. 5. This advances the governing wheels 65 sufficiently close to the work-rest to prevent work dropping from the rest into the chute 91, but it is not sufficiently advanced to press the work against the grinding wheel. The governing wheels are retained in this position while the roller 96 advances along the dwell 107 and during this dwell a piece of unfinished work is dropped on to the work-rest by automatic means which will later be described. After this piece of work has been dropped onto the rest the incline 109′ on the projection 109 advances the governing wheel to grinding position to press the piece of work against the surface of the grinding wheel 5. During the grinding operation, however, there must be a very gradual feeding movement imparted to the governing wheels 65 and this is attained by the action of the slightly inclined cam-surface 110 against the projecting lug 95. After the lug 95 has passed throughout the entire length of the inclined cam-surface 110 the grinding operation is continued for a short time until equilibrium is obtained, that is, until the work has been sufficiently reduced that there is practically no pressing of the work by the wheel 65 against the grinding wheel. This action is allowed by means of a dwell which may be an extension of the surface 110 or may be in the cam-groove 118.

As pointed out above the slide 60 supporting the governing wheel or wheels 65 is slidably mounted upon the slide 58, but this mounting is wholly for the purpose of adjustment. The slide 58 is provided with an upstanding lug 130 having threaded engagement with a screw 131 mounted in a bearing 132 on the slide 60. The outer end of this screw 131 is provided with a worm-wheel 133 meshing with a worm 134 secured on a short shaft 135 rotatably mounted in a bearing 136, the other end of this shaft being provided with a graduated disk 137 having a handle 138 by means of which it may be rotated to rotate the screw 131 to give five adjustments to the governing wheels 65. The bearing 136 is pivotally mounted on the slide 60 in the same manner as is the bearing 36 mounted on its support 37, that is, so that by loosening a nut 139 on a bolt extending through a curved slot in this bearing the worm 134 may be swung out of mesh with the worm-wheel 133, and as the shaft 132 is square at 140 a crank may be placed thereon to obtain a rapid adjustment.

The work is automatically fed to the work-rest from a magazine or hopper 141 placed above the grinding point as shown in Fig. 2. This magazine or hopper may be of any desired construction and is adapted to hold a plurality of unfinished pieces of work 148. In the present instance the lower part of the magazine has a short vertical guide passage 142 which is adapted to contain one or more pieces of work and through the lower end of which a plunger rod 143 passes. Below the plunger rod is a supporting surface having a bulge 144 between the lower end of the chute 142 and a second chute 145 for guiding the work to the top of the work-rest. The second chute 145 is spaced a short distance from the lower end of the chute 142 so that the work will not drop directly from the chute 142 to the chute 145 but must be transferred the short distance between them by means of the plunger 143 which plunger is attached in any suitable manner, in the present instance, by a set-screw 146 to an upstanding support 147 mounted on and movable with the support for the governing wheels 65. In the present instance, as there are two sets of opposed grinding and work-rotating or governing wheels, there are two plungers 143, one adjacent each set of wheels, and these plungers contact with the two opposite ends of a piece of work 148, so as to give a more reliable operation. It will be obvious that, when the governing wheels 65 are retracted under the action of the cam 105 to allow the work to drop from the work-rest, the plunger 143 will also be retracted and allow the piece of work to drop into the recess 149 at its lower end, the bulge 144 preventing this work from passing into the chute 145. When, however, the governing wheels 65 are advanced under the action of the cam 106, the plungers 143 push the work over the bulges 144 into the chute 145 so that the work drops onto the rest. The work drops while the governing wheel 65 is not being advanced or is being advanced at a retarded rate of speed, that is, while the anti-friction roller 96 is on the dwell 107. It is not necessary that the advancing movement of the wheels be stopped while the work is dropped onto the work-rest, but sufficient time should be allowed for the work to reach the rest before the governing wheels are advanced to grinding position. This time allowance may be obtained either by stopping the advance movement of the governing wheels or by merely retarding it or advancing them at a reduced speed for a short time. After the work has been dropped the cam 109′ advances the governing wheel to press the work against the grinding wheel as described above. In order to properly guide the work to the work-rest and to prevent its coming in contact with the grinding wheel before it has reached the rest and the governing wheel 65 is advanced to press it against the grinding surface as desired, the inner wall 150 of the chute 145 is extended downwardly as shown at 151 close to the surface of the grinding wheel and nearly down to the work-rest. This arrangement effectively keeps the work from coming in contact with the grinding wheel 5 until the work has been placed in proper grinding position.

As the grinding wheels in operation necessarily wear and under continued operation become more or less untrue they must be trued up in order to produce accurate work. This operation may be conveniently performed by means of a truing tool mounted upon the top of the guard 152 extending over the grinding wheel. In the present construct on, mounted on a flat surface of this guard is an upwardly extending bracket 153 provided with a vertical guideway 154 in which is mounted a slide 155. This slide is provided with a horizontal guideway 156 in which is mounted a second slide 157, the second slide carrying the tool 158 provided with a diamond point 159. The slide 155 may be in two sections, one of which is pivoted to the other by means of a stud 160 and is provided at its upper end with a curved slot 161 through which extends a bolt 162, the center of curvative of the slot being the center of the stud 160. By loosening the nut on the bolt 162 the outer section of the slide 155 may be given slight angular adjustment to taper the surface of the grinding wheel or to place the tool so as to make the surface cylindrical as desired during the finishing operation as will be obvious, the tool being moved over or across the surface of the wheel by means of a screw 163 provided with a hand-wheel 164 having screw-threaded engagement with the slide 157. The vertical position of the tool may be determined by means of a similar screw 165 having a graduated hand-wheel disk 166 having screw-threaded engagement with the vertically movable slide 155 in a manner well known.

In dressing or truing the surfaces of the governing wheel 65 each wheel should be speeded up and this operation is obtained through a second short shaft and suitable gears mounted in the bracket 78. A stud 167 is secured in the bracket 78 with its axis parallel with the shaft 77 and mounted upon this stud is a spur-gear 168 adapted to mesh with a spur-gear 169 on the shaft 77. Integral with or secured to the spur-gear 168 is a bevel-gear 170 which meshes with a second bevel-gear 171 geared to a short shaft 172 also mounted in the bracket 78 and which is provided with a spiral gear 173. Mounted upon the supporting shaft 64 for the governing wheel beyond the worm 79 and worm-wheel 80 is a second spiral gear 174. The bracket 78 is provided with a curved slot 175, and a bolt 176, secured to the frame, extends through this slot and is provided on its end with a nut 177. By loosening the nut 177 the frame 78 may be swung about the shaft 73 as a pivot, removing worm 79 from in mesh with the worm-wheel 80 and moving the spiral-gear 173 into mesh with the spiral-gear 174. The gears are so proportioned that this arrangement will increase the speed of the governing wheels 65 to give the proper surface speed for the truing operation. After the truing operation is completed the bracket 78 is swung in the opposite direction about the shaft 73, removing the gear 173 from in mesh with the gear 174 and restoring the worm 79 into mesh with the gear 80 which is the normal driving relation for the grinding operation.

The truing tool 184 having a diamond point is mounted in a holder 185 on a slide 186 mounted on a second slide 187 the two slides being mounted on V guides to slide in directions at right angles to each other, slide 186 being movable toward and from the governing wheel transverse the axis thereof by means of a screw operated by hand-wheel 188, and slide 187 being movable in a direction parallel with the axis of wheel 76 by a screw and hand-wheel 189 to move the tool across the surface of the wheel. In the present instance, as there are two governing wheels, there are two sets of slides 186 and 187 with a truing tool 184 for each one, but they are both moved across the surfaces of the wheel at the same time by means of the screw operated by hand-wheel 189, as the slides 187 are connected by a link 190.

To prevent heating of the work as it is being ground, means are provided for flushing it and the grinding wheel surface during the normal grinding wheel operation. A receptacle 180 is provided for emery charged water and a pump driven in any suitable manner from the power-shaft 11 or any other suitable source of power pumps this water through a system of piping 181 to discharge nozzles 182, located adjacent the surface of the grinding wheel 5 above the grinding point so that this water is discharged onto the surface of the grinding wheel and the work during normal grinding operation, the water passing downwardly into the chutes and other hollow spaces within the frame and is drained back into the receptacle or tank 180 to be used over again, there being a continuous circulation of this water.

In operation the grinding wheel 5 is rapidly rotated in the direction of the arrow, Figs. 2 and 3, the surface contacting with the work moving downwardly toward the top of the work-rest. The governing wheels 65 are slowly rotated in the same direction as also shown by the arrows, the surface contacting with the work moving upwardly away from the top of the work-rest. It will be seen that when this wheel presses the work against the surface of the grinding wheel, the work is rotated slowly in a clockwise direction as viewed in Figs. 2 and 3, and the surface thereof is ground by the action of the grinding wheel 5. Assuming that the operation of grinding a piece of work has been completed, under the action of the cam surface 105 the governing wheels 65 preferably are rapidly retracted away from the work-rest a sufficient distance to allow the work to drop from this rest into the chute 91 from which it passes into a suitable receptacle. To obviate all possibility of the work remaining on the rest when the wheels 65 are retracted a spring 183 is secured upon the support for the work-rest as shown in Fig. 2 and rests against the side of the work adjacent the grinding wheel and normally tends to press the work against the surface of the governing wheels 65. It will therefore be obvious that when the governing wheels 65 are retracted, this spring will force the work to the left as shown in Fig. 2, away from the surface of the grinding wheel so that it will necessarily fall into the chute 91. The governing wheels 65 are now advanced under the action of the cam 106 to a position spaced somewhat from the work-rest but not sufficient to allow the work to pass between it and the work-rest. This advance movement of the wheels 65 also advances the plungers 143 which transfer a piece of work from the bottom of the chute 142 into the chute 145 where it is guided to the top of the work-rest. The governing wheels 65 are now advanced under the action of the projection 109 to normal grinding position to press the work against the grinding wheels 5 and the reaction thereof will give sufficient grip for the wheels 65 on the work to rotate it as will be obvious. During this grinding operation the wheels 65 are slowly advanced toward the grinding wheels an amount equal to the amount of stock which is to be removed from the work, after which the grinding operation is continued a short time without any feeding movement toward the grinding wheel being imparted to the governing wheels 65. The work is now finished and the governing wheels 65 are again retracted to allow removal of the work from the work-rest. During the grinding operation the slide 4 upon which the grinding wheels 5 are mounted is preferably continuously reciprocated in a direction longitudinally of the axis of these wheels by means of the gearing 43, 42, 44, 45 and the crank 52 so as to give a uniform grinding throughout the surface to be ground and to compensate for any inequalities in the surface of the grinding wheel such as occur because of unequal wear due to non-uniform hardness of different portions of the grinding wheel.

In the present construction as will be noted there are two sets of grinding and regulating wheels spaced from each other longitudinally of their axes of rotation. By this arrangement two independent and spaced bearing surfaces may be simultaneously ground upon a single element such as a crankshaft 148. It is to be distinctly understood, however, that this invention is not limited to two sets of grinding and regulating wheels as more may be employed and the same principle may be employed with a single set of grinding and regulating wheels to grind one bearing surface at a time, such as the shanks of headed bolts and similar articles.

It will be seen from the foregoing that the machine is entirely automatic, the work being automatically discharged from and fed to the grinding position as the governing wheels 65 are automatically retracted and advanced under the operation of the cams.

Having thus set forth the nature of the invention, what I claim herein is:

1. A centerless grinder comprising low and high speed wheels adapted to simultaneously press in opposite directions upon a work-piece, a work-rest for holding work in operative relation to said wheels permitting the work-piece to rotate and adjust itself to the opposed pressures of said wheels, automatic means for feeding a work-piece to grinding position on said work-rest, and automatic means for relatively approaching said wheels to grind the work-piece to size and for relatively separating them when the grinding operation is completed to allow the work-piece to fall from its support through the space provided by separation of said wheels.

2. A centerless grinder comprising low and high speed wheels adapted to simultaneously press in opposite directions upon a work-piece, a work-rest permitting the work-piece to adjust itself to the opposed pressures of said wheels, automatic means for feeding a work-piece to grinding position on the work-rest, and automatic means for relatively approaching said wheels to grind the work-piece to size and for relatively separating them when the grinding operation is completed to allow the work-piece to fall from its support, said automatic feeding means being timed to feed a work-piece to grinding position after said wheels have been relatively approached part way from work-discharging position to grinding position.

3. A centerless grinder comprising low and high speed wheels adapted to simultaneously press in opposite directions upon a rotatable work-piece, a work-rest permitting the work-piece to rotate and adjust itself to the opposed pressures of said wheels, automatic means for imparting a two-stage approaching movement to said wheels to relatively place them first in work-receiving position and second in grinding position, said means being constructed to relatively separate said wheels when the grinding operation is completed, and means for feeding a work-piece to the work-rest after the wheels have been relatively approached to work-receiving position.

4. A centerless grinder comprising a peripheral grinding wheel and a work-governing wheel having its periphery opposed to that of the grinding wheel, means for holding work in operative relation to said wheels and permitting the work to adjust itself to the simultaneous opposed pressures of said wheels, means for rotating said grinding wheel at grinding speed and said governing wheel at a low speed to control the rotation of the work, the portion of the work surface contacted by the governing wheel moving in the same direction as the operative surface of the governing wheel and the grinding wheel being rotated so that its operative surface moves past, and in the same direction as, the portion of the work surface being ground by said grinding wheel, and means for continuously reciprocating said grinding wheel longitudinally of its axis during normal operation.

5. A centerless grinder comprising peripherally opposed grinding and work-governing wheels, means for rotating said grinding wheel at a grinding speed and said governing wheel at a low speed to control the rotation of the work, the portion of the work surface contacted by the governing wheel moving in the same direction as the operative surface of the governing wheel and the grinding wheel being rotated so that its operative surface moves past, and in the same direction as, the portion of the work surface being ground by said grinding wheel, a work-rest for holding work in operative relation to the peripheries of the said wheels, automatic means for advancing one of the wheels toward and from the other wheel to press the work against the grinding wheel and allow removal of the work from grinding position, and means for continuously reciprocating the grinding wheel longitudinally of its axis during normal operation.

6. A centerless grinder comprising peripherally opposed grinding and work-governing wheels, means for rotating said grinding wheel at grinding speed and said governing wheel at a low speed to control the rotation of the work, the portion of the work surface contacted by the governing wheel moving in the same direction as the operative surface of the governing wheel and the grinding wheel being rotated so that its operative surface moves past, and in the same direction as, the portion of the work surface being ground by said grinding wheel, a support for holding work in operative relation to the wheels, means for advancing the governing wheel to bring the work into contact with the grinding wheel and to retract said governing wheel to allow discharge of the work from grinding position, and automatic means for continuously reciprocating the grinding wheel longitudinally of its axis during the grinding operation.

7. A centerless grinder comprising peripherally opposed grinding and governing wheels adapted for simultaneous engagement with the work, means for rotating said grinding wheel at a grinding speed and said governing wheel at a low speed to control the rotation of the work, the portion of the work surface contacted by the governing wheel moving in the same direction as the operative surface of the governing wheel and the grinding wheel being rotated so that its operative surface moves past, and in the same direction as, the portion of the work surface being ground by said grinding wheel, a work-rest for holding work in operative relation to said wheels and permitting the work to accommodate itself to the simultaneous opposed pressures of said wheels, a supply magazine or hopper for holding the work to be operated upon, means for causing relative movement between said wheels in a direction transverse to their axes to allow for insertion and discharge of the work, and means operable by the relative movement between said wheels for transferring a piece of work from the magazine or hopper to the grinding position.

8. A centerless grinder comprising opposed grinding and governing wheels, a work-rest between said wheels, a supply magazine or hopper adapted to hold the work to be operated upon and positioned above said work-rest, means for relatively approaching the governing wheel and the grinding wheel to press upon a piece of work in grinding position therebetween, means for relatively separating said wheels to allow the discharge of the work from grinding position, and means governed by the relative approaching movement of said wheels to cause a piece of work to be dropped from said magazine or hopper onto said work-rest.

9. A centerless grinder comprising opposed grinding and governing wheels, a work-rest between said wheels, a supply magazine or hopper adapted to hold the work to be operated upon and positioned above said work-rest, automatic means for relatively separating the governing wheel and the grinding wheel to allow discharge of the finished work from grinding position, automatic means for relatively approaching the governing wheel and the grinding wheel in two steps, the first step being a movement insufficient to bring the work into contact with the grinding wheel, means governed by the relative approach of said wheels to cause a piece of work to drop from the magazine or hopper to the work-rest at the completion of said first step, said relative approaching means being adapted to subsequently further relatively move said wheels to bring the work to grinding position.

10. A centerless grinding comprising opposed grinding and governing wheels, means for rotating said grinding wheel at a grinding speed and said governing wheel at a low speed to govern the rotation of the work, the portion of the work surface contacted by the governing wheel moving in the same direction as the operative surface of the governing wheel and the grinding wheel being rotated so that its operative surface moves past, and in the same direction as, the portion of the work surface being ground by said grinding wheel, a work-rest for holding work in operative relation to the wheels, automatic means for retracting the governing wheel from the grinding wheel at the completion of a grinding operation to allow discharge of the work, automatic means for advancing the governing wheel toward the grinding wheel in two stages with a dwell or retarded movement between them, and means governed by the advancing movement of said wheel for causing the work to be fed onto the rest during said dwell or retarded movement.

11. A centerless grinder, comprising opposed grinding and governing wheels, means for rotating said grinding wheel at a grinding speed and said governing wheel at a low speed to govern the rotation of the work, the portion of the work surface contacted by the governing wheel moving in the same direction as the operative surface of the governing wheel and the grinding wheel being rotated so that its operative surface moves past, and in the same direction as, the portion of the work surface being ground by said grinding wheel, a work-rest for holding work in operative relation to the wheels, means for retracting the governing wheel from and advancing it toward the grinding wheel to allow for discharge of work from and placing work on the rest, and yielding means adapted to force the work from the rest as the governing wheel is retracted.

12. A centerless grinder comprising opposed spaced grinding and governing wheels, means for rotating said wheels, a work-rest between the wheels, a work-magazine or hopper spaced above the rest, and spaced guides forming a substantially vertical chute to guide the work from the magazine or hopper to the rest, the walls of the chute being arranged to prevent contact of the work with the grinding wheel as it passes to said rest.

13. A centerless grinder comprising opposed spaced grinding and governing wheels, means for rotating said wheels, a work-rest between the wheels, a work-magazine or hopper spaced above the rest, and spaced guides forming a chute to guide the work from the magazine or hopper to the rest, means for retracting and advancing the governing wheel relatively to the grinding wheel to allow for the discharge and feeding of the work and to bring the work to grinding position, and means governed by the advancing movement of said wheel to transfer a piece of work from the magazine or hopper to said chute.

14. A centerless grinder comprising a plurality of sets of peripherally opposed grinding and governing wheels, the wheels of each set rotating in the same direction at different speeds, the sets being spaced from each other longitudinally of the axes of the wheels so as to simultaneously grind to finished size a plurality of alined bearings on a single element, means for rotating the grinding and governing wheels, means for relatively moving said wheels transversely of their axes, and a work-rest between the wheels of each set.

15. A centerless grinder comprising a plurality of sets of peripherally opposed grinding and governing wheels, the sets being spaced from each other longitudinally of the axes of the wheels so as to simultaneously grind a plurality of alined bearings on a single element, means for continuously reciprocating said grinding wheels longitudinally of their axes during the grinding operation, and means for simultaneously retracting and advancing said governing wheels relatively to the grinding wheels to allow for the removal and insertion of the work and to bring the work to grinding position.

16. A centerless grinder comprising a plurality of sets of peripherally opposed grinding and governing wheels, the sets being spaced from each other longitudinally of the axes of the wheels so as to simultaneously grind a plurality of alined bearings on a single element, means for simultaneously retracting and advancing said governing wheels relatively to the grinding wheels to allow for removal and insertion of the work and bring the work to grinding position, a work-rest between the wheels of each set, a work-magazine above the work-rests, a work-guiding chute from the magazine to each work-rest, and means operated by the advancing movement of the governing wheel to transfer work from the magazine to said chute.

17. A centerless grinder comprising a fram, a movable slide mounted in said frame, bearings on said slide, a peripheral grinding wheel mounted to rotate in said bearings, a main power-shaft, operative means connecting said shaft and slide whereby the slide and grinding wheel are continuously reciprocated longitudinally of the axis of the wheel during normal operation, a second slide mounted on said frame and adapted to be shifted in a direction transverse to the axis of the grinding wheel, a governing wheel mounted on said second slide, means for rotating said wheel, a work-rest for holding work in operative relation to the two wheels, and means connecting said second slide and said main-shaft, to retract and advance said governing wheel with respect to the grinding wheel in certain timed relation to the grinding operation.

18. A centerless grinder comprising a frame, a pair of slides mounted on said frame and adapted to be shifted in directions substantially at right angles to each other, a grinding wheel mounted on one of said slides, a governing wheel mounted on the other slide with its periphery opposed to that of the grinding wheel, means for rotating said wheels, a power-shaft, and operative connections between the slides and the shaft whereby the slides are automatically shifted.

19. A centerless grinder comprising a frame provided with a plurality of slideways, slides mounted on said slideways, opposed grinding and governing wheels mounted on said slides so that they may be moved toward and from each other, a work-rest for holding work in operative relation to said wheels permitting the work to adjust itself to the simultaneous opposed pressures of said wheels, a main power-shaft mounted in bearings in said frame below said wheels, and means for driving said wheels from said shaft.

20. A centerless grinder comprising a frame, a grinding wheel mounted on said frame, means for rotating said wheel, a slide movably mounted on said frame, a governing wheel mounted on said slide, means for rotating said governing wheel, a work-support for holding work in operative relation to said wheels permitting the work to adjust itself to the simultaneous opposed pressures of said wheels, means for moving the said slide with the governing wheel toward and from the grinding wheel in certain timed relation with the grinding operation, said means comprising a movable cam-plate having cam-surfaces, means on the slide cooperating with said cam-surfaces, a cam-disk provided with a cam-groove, means on the cam-plate coacting with said groove, and means for rotating the cam-disk.

21. A centerless grinder comprising opposed grinding and governing wheels, a work-support for holding work in operative relation to said wheels, and automatic means for retracting and advancing said governing wheel relatively to the grinding wheel to allow for discharge and insertion of work between said wheels, said means comprising two cam means operating in series, and means for operating said cam means.

22. A centerless grinder comprising opposed grinding and governing wheels, means for supporting one of the wheels so that it may be moved toward and from the other wheel, a work-rest for holding work in operative relation to the wheels adapted to support the work during the grinding operation, and automatic means for advancing the movable wheel to press the work against the other wheel and for retracting said wheel to allow of the discharge of the work after the grinding operation is completed.

23. A centerless grinder comprising low and high speed wheels adapted to simultaneously press in opposite directions upon a work-piece, a work-support between said wheels permitting the work-piece to adjust itself to the opposed pressures of said wheels, and automatic means for relatively approaching said wheels to grind the work-piece to size and for relatively separating them sufficiently to permit the work-piece to fall by gravity from said work-support through the space between the latter and one of the wheels.

24. In apparatus of the character described, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; and power driven means for moving one of said means to change the relation of the grinding throat to the work.

25. In apparatus of the character described, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; means for moving one of said means to change the relation of the grinding throat to the work and to release the latter from the grip of the wheels; and means acting in timed relation to the actuation of said last-mentioned means for removing a work-piece from the grinding throat.

26. In apparatus of the character described, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operated surface moves past, and in the same direction as, the portion of the work surface being ground by said grinding wheel, and the third of which means includes a member for holding work of round section in operative relation to said two wheels; means for moving one of said means to change the relation of the grinding throat to the work and to condition the grinding throat to receive a work-piece; and means acting in timed relation to the actuation of said last-mentioned means for effecting movement of a work-piece into the grinding throat.

27. In apparatus of the character described, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; power-driven means for moving one of the said means to change the relation of the grinding throat to the work and thereby to effect a release of the work from the grip of the wheels and means controlled by said power-driven means for removing a work-piece from said work-holding member.

28. In apparatus of the character described, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; means for moving one of said means to change the relation of the grinding throat to the work and to condition the grinding throat to receive a work-piece; a magazine for holding a supply of work-pieces; and means operating in timed relation to the actuation of said last-mentioned means for transferring a work-piece from said magazine into said grinding throat.

29. In apparatus of the character described, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; mechanism operating in recurring sequence to change the relation of one of said means with respect to another, thereby to effect a release of a work-piece from the grip of the wheels; and means acting in timed relation with respect to said mechanism for effecting a movement of the work out of said grinding throat.

30. In apparatus of the character described, in combination, a grinding throat adapted for simultanenous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; means adapted upon operation to change the relation of one of said means with respect to another and thereby condition said grinding throat for the insertion of a work-piece; a magazine adapted to hold a supply of work-pieces; guiding means for guiding a work-piece from said magazine into said grinding throat; and means acting in timed relation with respect to said grinding-throat-conditioning means for effecting a movement of a work-piece from said magazine and along said guiding means.

31. In apparatus of the character described, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; means adapted upon operation thereof to change the relation of one of said means with respect to another and thereby condition said grinding throat for the removal of a work-piece therefrom; and means for preventing contact with the grinding wheel of a work-piece being removed from the grinding throat.

32. In apparatus of the character described, in combination, a grinding throat adapted for simultanenous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; means adapted upon operation thereof to change the relation of one of said means to another and thereby condition said grinding throat for the insertion of a work-piece; and means for preventing contact with the grinding wheel of a work-piece being inserted into said grinding throat.

33. In apparatus of the character described, in combination, a grinding throat adapted for simultanenous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; the operative surface of said regulating wheel having a path of travel substantially at right angles to its line of contact with the work, whereby feeding movement of work in an axial direction is prevented; and means for effecting a movement of a work-piece into said grinding throat for rotation by the regulating wheel and for grinding action thereon by the grinding wheel and for effecting a movement of said work-piece out of said grinding throat.

34. In apparatus of the character described, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; the operative surface of said regulating wheel having a path of travel substantially at right angles to its line of contact with the work, whereby said regulating wheel controls the rotation of the work-piece without feeding movement thereof in an axial direction; means including guides for guiding a work-piece, into the grinding throat; and means for effecting a movement of a work-piece along said guides.

35. In apparatus of the character described, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; the operative surface of said regulating wheel having a path of travel substantially at right angles to its line of contact with the work; whereby said regulating wheel controls the rotation of the work-piece without feeding movement thereof in an axial direction; and means for effecting a removal of a work-piece from said grinding throat.

36. In apparatus of the character described, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; the operative surface of said regulating wheel having a path of travel substantially at right angles to its line of contact with the work, whereby said regulating wheel controls the rotation of the work-piece without feeding movement thereof in an axial direction; and means under the control of a power-actuated member for effecting a removal of the work-piece from said grinding throat.

37. In apparatus of the character described, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; means adapted upon operation to change the relation of one of said means with respect to the other and to thereby condition said grinding throat for the insertion therein of a work-piece; a magazine for holding a supply of work-pieces and provided with an opening; a reciprocating member adapted in one position to close said opening to prevent egress of a work-piece from said magazine, said reciprocating member being adapted upon operation to permit release of a work-piece from the magazine and to effect a movement of a work-piece into said grinding throat; and means for operating said reciprocating member in timed relation to said grinding-throat-conditioning means.

38. In apparatus of the character described, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; said grinding throat presenting at least three lines of contact to work of round section inserted therein; means for guiding a work-piece into said grinding throat; and a plunger for effecting movement of a work-piece along said guiding means and thereby effect its introduction into said grinding throat.

39. In apparatus of the character described, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; said grinding throat presenting at least three lines of contact to work of round section inserted therein; means for guiding a work-piece into said grinding throat; a member mounted for reciprocation and adapted upon operation in one direction to permit positioning of a work-piece in advance thereof and upon operation in its other direction to effect movement of said work-piece along said guiding means and thereby to effect its introduction into said grinding throat.

40. In apparatus of the character described, in combination, a grinding wheel adapted to be rotated at relatively high speed, a regulating wheel adapted to be rotated at relatively low speed, said wheels being adapted to present adjacent operative surfaces traveling in opposite directions, means for guiding a work-piece of round section into operative relation to said two wheels, a magazine for holding a supply of work-pieces and operatively related to said guiding means, and intermittently operative means adapted to provide an opening through which an individual work-piece may be passed from said magazine into operative relation to said guiding means.

41. In apparatus of the character described, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; means for changing the relation of one of said means with respect to another and to thereby condition said grinding throat to receive a work-piece; and means operating in timed relation with respect to said last-mentioned means for effecting a movement of a work piece into said grinding throat and in a direction substantially transverse to the direction in which said grinding throat extends.

42. In apparatus of the character described, in combination, a grinding throat adapted for simultanenous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; means for changing the relation of one of said means relative to another and to thereby effect a release of a work-piece from the grip of said wheels; and means operating in timed relation with respect to said last-mentioned means for effecting a movement of a work-piece out of said grinding throat and in a direction substantially transverse to the axis of the work-piece.

43. In apparatus of the general nature of that herein described, in combination, a main frame; a grinding wheel supported thereby; a regulating wheel supported by said frame and operatively related to said grinding wheel; means for holding work of round section in operative relation to said two wheels; a main driving shaft rotatably supported by said frame and adapted to be connected to a source of power; driving connections between said shaft and said wheels having included therein speed-change mechanism arranged to permit said grinding wheel to be driven at a relatively high speed and said regulating wheel at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel; and operative connections between said main driving shaft and said grinding wheel arranged to effect a reciprocating movement of said grinding wheel lengthwise of the work operated upon thereby.

44. In apparatus of the general nature of that herein described, in combination, a main frame; a grinding wheel supported thereby; a regulating wheel supported by said frame and operatively related to said grinding wheel; means for holding work of round section in operative relation to said two wheels; a main driving shaft rotatably supported by said frame and adapted to be connected to a source of power; driving connections between said shaft and said wheels having included therein speed-change mechanism arranged to permit said grinding wheel to be driven at a relatively high speed to grind the work and said regulating wheel at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel; and operative connections including speed-change mechanism for effecting a reciprocating movement of said grinding wheel in a direction substantially lengthwise of the work operated upon thereby.

45. In apparatus of the general nature of that herein described, in combination, a main frame; a grinding wheel supported thereby; a regulating wheel supported by said frame and operatively related to said grinding wheel; means for holding work of round section in operative relation to said two wheels; a main driving shaft rotatably supported by said frame and adapted to be connected to a source of power; driving connections between said shaft and said wheels having included therein speed-change mechanism arranged to permit said grinding wheel to be driven at a relatively high speed to grind the work and said regulating wheel at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel; a member mounted for reciprocation and adapted upon reciprocating movement to effect a reciprocation of said grinding wheel in a direction substantially lengthwise of the work operated upon thereby; and means including speed-reducing gearing driven from said main driving shaft for reciprocating said member.

46. In apparatus of the general nature of that herein described, in combination, a main frame; a grinding throat adapted for simultaneous grinding and rotating action on work of round section and comprising three means, supported by said main frame, one of which means is in the form of a grinding wheel, another of said means being in the form of a regulating wheel, and the third of which means includes a member for holding work of round section in operative relation to said two wheels; a main driving shaft rotatably supported by said frame and adapted to be connected to a source of power; driving connections between said shaft and said wheels having included therein speed-change mechanism arranged to permit said regulating wheel to be driven at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel; and mechanism driven from said main driving shaft for periodically changing the relation between said means forming said grinding throat.

47. In apparatus of the general nature of that herein described, in combination, a main frame; a grinding throat adapted for simultaneous grinding and rotating action on work of round section and comprising three means, supported by said main frame, one of which means is in the form of a grinding wheel, another of said means being in the form of a regulating wheel, and the third of which means includes a member for holding work of round section in operative relation to said two wheels; a main driving shaft rotatably supported by said frame and adapted to be connected to a source of power; driving connections between said shaft and said wheels having included therein speed-change mechanism arranged to permit said regulating wheel to be driven at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel; mechanism driven from said main driving shaft for periodically changing the relation between said means forming said grinding throat; and mechanism driven from said main driving shaft for effecting a relative reciprocating movement in a direction lengthwise of the work between the grinding wheel and the work.

48. In apparatus of the general nature of that herein described, in combination, a main frame; a grinding throat adapted for simultaneous grinding and rotating action on work of round section and comprising three means, supported by said main frame, one of which means is in the form of a grinding wheel, another of said means being in the form of a regulating wheel, and the third of which means includes a member for holding work of round section in operative relation to said two wheels; a main driving shaft rotatably supported by said frame and adapted to be connected to a source of power; driving connections between said shaft and said wheels having included therein speed-change mechanism arranged to permit said regulating wheel to be driven at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel; means operated from said main driving shaft for effecting periodically a change in the relation between said means forming the grinding throat and to thereby periodically condition the latter for receiving a work-piece; and means operating in timed relation with respect to said last-mentioned means for effecting a movement of a work-piece into the grinding throat.

49. In apparatus of the general nature of that herein described, in combination, a main frame; a grinding throat adapted for simultaneous grinding and rotating action on work of round section and comprising three means, supported by said main frame, one of which means is in the form of a grinding wheel, another of said means being in the form of a regulating wheel, and the third of which means includes a member for holding work of round section in operative relation to said two wheels; a main driving shaft rotatably supported by said frame and adapted to be connected to a source of power; driving connections between said shaft and said wheels having included therein speed-change mechanism arranged to permit said regulating wheel to be driven at a relatively low speed to control the rotation of the work, the portion of the work surface contacted by the regulating wheel moving in the same direction as the operative surface of the regulating wheel and the grinding wheel being rotated so that its operative surface moves past, and, in the same direction as, the portion of the work surface being ground by said grinding wheel; means operated from said main driving shaft for effecting a periodic change in the relation between said means forming said grinding throat and to thereby periodically condition the latter to release a work piece from the grip of said wheels; and means actuated in timed relation with respect to said last-mentioned means for effecting a removal of a work-piece from said grinding throat.

50. A centerless grinding machine, comprising a grinding wheel; a governing or control-wheel peripherally opposed to the grinding wheel; a work-rest or support intermediate said wheels, said wheels having their axes parallel; means for rotating the grinding and governing wheels about their respective axes in one and the same direction, the grinding wheel at a relatively high speed and the governing wheel at a relatively low speed; means for varying the distance between the proximate peripheral faces of said wheels; and means for automatically removing the work from the work-rest between said wheels when the grinding is completed.

51. A centerless grinding machine comprising, in combination, a grinding wheel; a governing or control-wheel; an intermediate work-rest or support; means for progressively advancing and receding one of said wheels toward and from the other; and means for automatically removing the work from between said wheels after it is completely ground.

52. A centerless grinding machine, comprising a grinding wheel and a governing or control-wheel peripherally opposed, said wheels having their axes in common plane; means for rotating said wheels about their respective axes in one and the same direction, the grinding wheel at relatively high speed and the governing wheel at relatively low speed; a work-rest between the effective operating faces of said wheels, upon which rest the work lies without axial movement during the grinding; means for varying the distance between the opposed working faces of the wheels; and means for automatically removing the work from the work rest when the grinding is completed.

53. A grinding machine, comprising a grinding element; a governing or control element; an intermediate work-rest or support; means for driving the grinding and the governing elements, the grinding element moving downward toward the work-rest at relatively high speed, thereby to perform a grinding operation upon work of round section, and the governing element moving upward toward the work-rest at relatively low speed, thereby to control the rotation of the work; means for advancing one of said elements toward the other gradually and to a predetermined extent for effecting simultaneous grinding and rotating action respectively by said elements upon round work interposed therebetween, and for thereafter separating said wheels to release the work from the grip of said elements; and mechanism acting at each separation of one element from the other for removing a work-piece from said work-rest and for thereafter effecting a movement of a work-piece onto said work-rest.

54. In apparatus of the character described, in combination, a grinding wheel adapted to be rotated at a relatively high speed, a regulating wheel adapted to be rotated at a relatively low speed, said wheels being adapted to present adjacent operative surfaces traveling in opposite directions, means extending between said wheels for holding work of round section in operative relation to said wheels, and power-controlled means for bringing about a movement of the work in a direction substantially transverse to its axis and into or out of operative relation with respect to said adjacent operative surfaces of said two wheels.

55. In apparatus of the character described, in combination, a grinding wheel adapted to be rotated at a relatively high speed, a regulating wheel adapted to be rotated at a relatively low speed, said wheels being adapted to present adjacent operative surfaces traveling in opposite directions, means extending between said wheels for holding work of round section in operative relation to said wheels, said regulating wheel being positioned on one side of said work-holding means and adapted to control the rotation of the work and said grinding wheel being positioned on the other side of said work-holding means and movable in the general direction in which said holding means extend, and means for reciprocating said movable grinding wheel comprising a rotatable crank, connections between said crank and said grinding wheel, and means for varying the throw of said crank.

56. In apparatus of the character described, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; power driven means for moving one of said means to change the relation of the grinding throat to the work, thereby to permit the insertion or removal of a work piece with respect to said grinding throat; and means controllable at will for making said power driven means ineffective.

57. In apparatus of the character described, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; a driven shaft; means operated from said driven shaft for moving one of said means to change the relation of the grinding throat to the work; and clutch for controlling the operation of said last-mentioned means from said driven shaft.

58. In apparatus of the general nature of that herein described, in combination, a main frame; a grinding throat adapted for simultaneous grinding and rotating action on work of round section and comprising three means, supported by said main frame, one of which means is in the form of a grinding wheel, another of said means being in the form of a regulating wheel, and the third of which means includes a member for holding work of round section in operative relation to said two wheels; a main driving shaft rotatably supported by said frame and adapted to be connected to a source of power; driving connections between said shaft and said wheels having included therein speed-change mechanism arranged to permit said grinding wheel to be driven at relatively high speed to grind the work and said regulating wheel at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel; means operated from said main driving shaft for effecting periodically a change in the relation between said means forming the grinding throat and to thereby periodically condition the latter for receiving a work-piece; and means operable at will for making said last-mentioned means ineffective.

59. In apparatus of the character described, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; power actuated means for moving one of said means to change the relation of the grinding throat to the work; and means operable independently of said power driven means for adjusting the means moved thereby toward or away from another of said means forming said grinding throat.

60. In apparatus of the character described, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; and mechanism adapted upon operation to effect an enlargement of said grinding throat and thereafter to effect a restriction of said grinding throat, said mechanism being constructed and arranged to cause the enlarging of said grinding throat to take place more rapidly than the restriction thereof.

61. In apparatus of the character described, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; and mechanism adapted upon operation to effect a restriction of said grinding throat in two successive stages, the first stage of which is of such a character as to permit the insertion into the grinding throat of a work piece and the second stage of which is of such a character as to effect and complete the grinding operation upon the work piece.

62. In apparatus of the character described, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; and mechanism adapted upon operation to effect an enlargement of said grinding throat, thereby to permit removal of a work piece therefrom, and then to effect a restriction of said grinding throat in substantially two successive stages, the first of which is of such a character as to permit the insertion of a work piece into the grinding throat, and the second of which is of such a character as to effect and bring about a completion of the grinding operation upon the work piece.

63. In apparatus of the character described, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; means operating in recurring sequence to enlarge and restrict said grinding throat and operating to effect the enlargement of the grinding throat more rapidly than the restriction thereof; and mechanism operating in timed relation with respect to said last-mentioned means for effecting a removal of a work piece from the grinding throat upon the enlargement of the latter and for effecting movement of a work piece into the grinding throat prior to the completion of the restriction of the latter.

64. In apparatus of the character described, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operatve surface moves past, and in the same direction as, the portion of the work surface being ground by said grinding wheel, and the third of which means includes a member for holding work of round section in operative relation to said two wheels; means for effecting an enlargement of said grinding throat thereby to permit removal of a work piece therefrom, and for effecting a restriction of said grinding throat in two successive stages, the first of which is of such a character as to permit the insertion of a work piece into the grinding throat and the second of which is of such a character as to effect a completion of the grinding operation upon the work piece; and means operating in timed relation with respect to said last-mentioned means for effecting a movement of a work piece into said grinding throat prior to the commencement of said second stage of restriction of said grinding throat.

65. In apparatus of the character described, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; means for effecting an enlargement of said grinding throat thereby to permit removal of a work piece therefrom, and for effecting a restriction of said grinding throat in two successive stages, the first of which is of such a character as to permit the insertion of a work piece into the grinding throat and the second of which is of such a character as to effect a completion of the grinding operation upon the work piece; and means operating in timed relation with respect to said last-mentioned means for effecting a removal of a work piece from said grinding throat during the enlargement of the latter and for effecting a movement of a work piece into said grinding throat prior to the commencement of said second stage of restriction of said grinding throat.

66. In apparatus of the character described, in combination, a grinding throat adapted for simultaneous grinding and rotating action upon work of round section and comprising three means, one of which means is in the form of a grinding wheel adapted to be rotated at a relatively high speed, another of said means being in the form of regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; means for moving one of said means to change the relation of the grinding throat to the work and to condition the grinding throat to receive a work piece; means acting in timed relation to the actuation of said last-mentioned means for effecting movement of a work piece into the grinding throat; and means adapted at will to make ineffective said last-mentioned timed means.

67. In apparatus of the character described, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; a driven shaft; means operated from said driven shaft for controlling the movement of a work piece relative to said grinding throat; and a clutch for controlling the operation of said last-mentioned means from said shaft.

68. In apparatus of the character described, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; means having connections to move one of said means and adapted upon operation to effect a predetermined enlargement of said grinding throat and a subsequent predetermined restriction of said grinding throat; and means included in said connections for predetermining the range of action of said mechanism.

69. In apparatus of the character described, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; a cam of predetermined shape for moving one of said means to thereby effect a predetermined change in the relation between the means forming said grinding throat; and means for changing at will the effect of said cam.

70. In apparatus of the character described, in combination, a grinding wheel rotatable at a relatively high speed; a regulating wheel rotatable at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, means for holding work of round section in operative relation to the adjacent operative surfaces of said two wheels; means mounting one of said wheels to permit it to be moved toward or away from the other of said wheels; a cam of predetermined shape for moving the movable wheel; and means interposed between said cam and the movable wheel adapted to vary the action of said cam.

71. A precision grinding machine comprising a rapidly rotated grinding wheel and a slowly rotated work regulating wheel, means for holding work in position between said wheels, means for moving one of the wheels through an invariable distance toward and away from the other to grind successive work pieces to a uniform predetermined size, and means for adjusting the extent of said wheel movement.

72. A grinding machine comprising a rapidly rotated grinding wheel and a slowly rotated work regulating wheel, means for holding work in position between said wheels, a mechanism for moving one of the wheels through an invariable distance toward and away from the other, means for adjusting said mechanism to change the distance of travel for the movable wheel.

73. A grinding machine comprising a rapidly rotated grinding wheel and a slowly rotated work regulating wheel, means for holding work in operative position between said wheels, and a cam operated mechanism for moving one of the wheels through any desired invariable distance toward and away from the other, and means for adjusting said mechanism to change the distance of travel of the movable wheel.

74. A grinding machine comprising a rapidly rotated grinding wheel and a slowly rotated work regulating wheel, one of which is movable toward and away from the other, means for holding the work in position for operation thereon by said wheels, a rotatably mounted cam, and adjustable connections between said cam and movable wheel adapted to move the wheel toward and away from the other cyclically but through a variable and predetermined distance.

75. In an apparatus of the general nature of that herein described, in combination, means for supporting work of round section and adapted to permit rotation thereof, a regulating wheel adapted to be rotated at a relatively low speed and operatively related to said work supporting means to permit said regulating wheel to engage the work on one side thereof, thereby to control the rotation of the work, a grinding wheel adapted to be rotated at a relatively high speed and operatively related to said work supporting means to permit said grinding wheel to perform a grinding operation upon the work and substantially at the other side thereof, and means for causing a relative movement to take place between said grinding wheel and said work supporting means in a general direction lengthwise of the work.

76. In apparatus of the general nature of that herein described, in combination, means for supporting work of round section and adapted to permit rotation thereof, a regulating wheel adapted to be rotated at a relatively low speed and operatively related to said work supporting means to permit said regulating wheel to engage the work on one side thereof, thereby to control the rotation of the work, a grinding wheel adapted to be rotated at a relatively high speed and operatively related to said work supporting means to permit said grinding wheel to perform a grinding operation upon the work and substantially at the other side thereof, and means for causing a relative reciprocating movement to take place between said grinding wheel and said work supporting means and in the general direction in which the work extends.

77. In apparatus of the character described, in combination, a grinding wheel adapted to be rotated at a relatively high speed, a regulating wheel adapted to be rotated at a relatively low speed to control the rotation of the work, the portion of the work surface contacted by the regulating wheel moving in the same direction as the operative surface of the regulating wheel and said grinding wheel being rotated so that its operative surface moves past, and in the same direction as, the portion of the work surface being ground by said grinding wheel, means for holding work in operative relation to said two wheels and adapted to permit rotation thereof by said regulating wheel, means for effecting a movement of the grinding wheel in a general direction lengthwise of the work, and means for effecting a movement of one wheel away from the other to release the work from the grip of the wheels.

78. In apparatus of the character described, in combination, a grinding wheel adapted to be rotated at a relatively high speed, a regulating wheel adapted to be rotated at a relatively low speed to control the rotation of the work, the portion of the work surface contacted by the regulating wheel moving in the same direction as the operative surface of the regulating wheel and said grinding wheel being rotated so that its operative surface moves past, and in the same direction as, the portion of the work surface being ground by said granding wheel, means for effecting a movement of the grinding wheel in a general direction lengthwise of the work, means adapted upon actuation to effect movement of one wheel toward the other to bring the work to grinding position relative to the grinding wheel and to move one wheel away from the other to permit the replacement of ground work, and yieldingly acting means for yieldingly urging the work on said work-holding means in a direction toward the regulating wheel.

79. In apparatus of the character described, in combination, a grinding wheel adapted to be rotated at a relatively high speed, a regulating wheel adapted to be rotated at a relatively low speed to control the rotation of the work, the portion of the work surface contacted by the regulating wheel moving in the same direction as the operative surface of the regulating wheel and said grinding wheel being rotated so that its operative surface moves past, and in the same direction as, the portion of the work surface being ground by said grinding wheel, means adapted upon actuation to effect movement of one wheel toward the other to bring the work to grinding position relative to the grinding wheel and to move one wheel away from the other to permit the replacement of ground work, and yieldingly acting means for yieldingly urging the work on said work-holding means in a direction toward the regulating wheel.

80. In apparatus of the character described, in combination, a grinding wheel rotatable at a relatively high speed; a regulating wheel rotatable at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel; means for holding work of round section in operative relation to the adjacent operative surfaces of said two wheels; means mounting one of said wheels to permit it to be moved toward or away from the other of said wheels, said mounting means including a slide movable toward or away from the other wheel, a second slide carried by and movable relative to said first slide and having said one wheel rotatably mounted thereon, and connections between said two slides adapted to permit determination at will of the position of said second slide and the wheel carried thereby relative to said first slide; a cam of predetermined shape for moving said first slide; and means interposed between said cam and the movable wheel adapted to vary the action of said cam.

81. In apparatus of the character described, in combination, a grinding wheel rotatable at a relatively high speed; a regulating wheel rotatable at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel; means movably mounting one of said wheels relative to the other; and means for controlling the movement of said movable wheel relative to the other, said controlling means including a driven cam having a plurality of fixed cam portions, one of which effects movement of the movable wheel toward the other and another of which effects movement of the movable wheel away from the other, and means interposed between said cam and the movable wheel for varying the amplitude of movement effected by at least one of said cam portions.

82. In apparatus of the character described, in combination, a frame; opposed grinding and regulating wheels mounted on said frame for cooperation one with the other; means supporting one of said wheels for sliding movement relative to the other; a slide block slidably carried and guided by said frame; means for oscillating said slide block; connections between said slide block and said wheel-supporting means for shifting said one wheel in response to movement of said slide block; and means for varying the distance between said slide block and said movable wheel adapted thereby to vary the limit of width of the throat between said two wheels.

83. In apparatus of the character described, in combination, a frame; opposed grinding and regulating wheels mounted on said frame for cooperation one with the other; means supporting one of said wheels for sliding movement relative to the other; a slide block slidably carried and guided by said frame; a driven cam for oscillating the slide block; and variable connecting means interposed between said block and said wheel-mounting means adapted to permit variation of the amplitude of movement transmitted to said wheel-mounting means by said oscillating slide block.

84. In apparatus of the character described, in combination, a frame; opposed grinding and regulating wheels mounted on said frame for cooperation one with the other; a member mounting one of said wheels for movement relative to the other; a slide block member slidably carried and guided by said frame adapted to move said wheel-mounting member; a driven fixed cam member for oscillating said slide block member; and variable connecting means between two of said members adapted to permit variation of the amplitude of movement of said movable wheel even though said cam member is per se invariable.

85. In apparatus of the character described, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, and the third of which means includes a member for holding work of round section in operative relation to said two wheels; and mechanism adapted upon operation to effect enlargement and restriction of said grinding throat in a plurality of stages, said mechanism being constructed to provide a first stage of throat restriction of a character as to permit the insertion into the grinding throat of a work piece, then a second stage of throat restriction followed by substantially a dwell to initiate and complete the grinding operation upon the work piece, and then to effect enlargement of the grinding throat to permit removal of the work piece therefrom.

86. In apparatus of the character described in which a grinding wheel rotated at a relatively high speed and a regulating wheel rotated at a relatively low speed respectively grind and rotate work of round section interposed therebetween, the combination of the regulating wheel with a worm wheel connected to said regulating wheel; a worm; means movably mounting said worm adapted to permit said worm to be meshed with said worm wheel for driving said regulating wheel at said slow speed and in said direction or to permit said worm to be disengaged from said worm wheel; means adapted to drive said regulating wheel at a truing speed when said worm and worm wheel are disengaged; a driving shaft; and connections between said driving shaft and said worm.

87. In apparatus of the character described, in combination, a grinding wheel rotatable at a relatively high speed; a regulating wheel rotatable at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel; means for holding work of round section in operative relation to the adjacent operative surfaces of said two wheels; a worm wheel connected to drive said regulating wheel; a worm; means movably mounting said worm for movement in a direction toward or away from said worm wheel and having a range of movement in a direction toward said worm wheel greater than that necessary to mesh the worm with the worm wheel; means for controlling the position of said worm-mounting means; and means for driving said worm, said worm and worm wheel driving said regulating wheel at said speed and in said direction.

In testimony whereof, I have signed my name to this specification, this 13th day of May, 1927.

WILBUR J. PEETS.